US012154518B2

(12) United States Patent
Lee

(10) Patent No.: US 12,154,518 B2
(45) Date of Patent: Nov. 26, 2024

(54) DISPLAY DEVICE AND METHOD OF DRIVING THE SAME

(71) Applicant: LG DISPLAY CO., LTD., Seoul (KR)

(72) Inventor: Cheol Su Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/384,902

(22) Filed: Oct. 30, 2023

(65) Prior Publication Data

US 2024/0185803 A1 Jun. 6, 2024

(30) Foreign Application Priority Data

Dec. 2, 2022 (KR) ........................ 10-2022-0166502

(51) Int. Cl.
*G09G 3/3291* (2016.01)
*G09G 3/3233* (2016.01)

(52) U.S. Cl.
CPC ......... *G09G 3/3291* (2013.01); *G09G 3/3233* (2013.01); *G09G 2300/043* (2013.01); *G09G 2300/0819* (2013.01); *G09G 2300/0842* (2013.01); *G09G 2310/0294* (2013.01); *G09G 2310/08* (2013.01); *G09G 2320/0295* (2013.01); *G09G 2320/045* (2013.01); *G09G 2330/12* (2013.01)

(58) Field of Classification Search
None
See application file for complete search history.

(56) References Cited

U.S. PATENT DOCUMENTS

| | | | | |
|---|---|---|---|---|
| 11,676,534 B2* | 6/2023 | Kim | G09G 3/3258 345/214 |
| 2013/0127692 A1* | 5/2013 | Yoon | G09G 3/3258 345/80 |
| 2015/0154908 A1* | 6/2015 | Nam | G09G 3/3233 345/76 |
| 2016/0247450 A1* | 8/2016 | Liu | G09G 3/3233 |
| 2018/0033373 A1* | 2/2018 | Hong | G09G 3/3233 |
| 2020/0175923 A1* | 6/2020 | Kim | G09G 3/3275 |
| 2021/0201797 A1* | 7/2021 | Lee | G09G 3/3258 |
| 2022/0319430 A1 | 10/2022 | Wang et al. | |

FOREIGN PATENT DOCUMENTS

| | | |
|---|---|---|
| CN | 115294935 A | 11/2022 |
| TW | 2022-26195 A | 7/2022 |

OTHER PUBLICATIONS

Taiwanese Notice of Allowance, dated Oct. 9, 2024 issued in Patent Application No. 11321032600 (4 pages).

* cited by examiner

*Primary Examiner* — Dorothy Harris
(74) *Attorney, Agent, or Firm* — POLSINELLI PC

(57) ABSTRACT

Provided is a display device including a display panel including a sub-pixel connected to a data line and a reference line, a driving circuit configured to supply a data voltage to the display panel through the data line, and a sensing circuit including a sampling circuit for sensing the display panel through the reference line, wherein the sampling circuit includes a sampling switch having a turn-on state within an image display period of the display panel to acquire a sensing voltage by sensing the reference line and determine presence or absence of a defect based on the sensing voltage.

18 Claims, 21 Drawing Sheets

DISPLAY DEVICE AND METHOD OF DRIVING THE SAME

CROSS REFERENCE TO RELATED APPLICATIONS

This application claims the benefit of Korean Patent Application No. 10-2022-0166502, filed on Dec. 2, 2022, which is hereby incorporated by reference as if fully set forth herein.

BACKGROUND

Technical Field

The present disclosure relates to a display device and a method of driving the same.

Discussion of the Related Art

With the development of information technology, the market for display devices that are media for connection between users and information is growing. Accordingly, display devices such as a light emitting diode (LED), a quantum dot display (QDD), and a liquid crystal display (LCD) have been increasingly used.

The above-identified display devices each include a display panel including sub-pixels, a driver which outputs a driving signal for driving of the display panel, and a power supply which generates power to be supplied to the display panel or the driver.

In these display devices, when sub-pixels are supplied with driving signals, for example, a scan signal and a data signal, the selected sub-pixel may transmit light therethrough or may directly emit light, thereby displaying an image.

SUMMARY

The present disclosure is directed to a display device and a method of driving the same that substantially obviate one or more problems due to limitations and disadvantages of the related art.

An object of the present disclosure is to efficiently detect a defect such as presence or absence of an abnormality or defect in the entire display panel during a period for displaying an image on the display panel. In addition, another object of the present disclosure is to sense presence or absence of a defect in a driving transistor, an organic light-emitting diode, a power circuit, etc. in real time. In addition, another object of the present disclosure is to provide a defect detection method that does not affect or is not affected by characteristics of an element such as a driving transistor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display device includes a display panel including a sub-pixel connected to a data line and a reference line, a driving circuit configured to supply a data voltage to the display panel through the data line, and a sensing circuit including a sampling circuit for sensing the display panel through the reference line, wherein the sampling circuit includes a sampling switch having a turn-on state within an image display period of the display panel to acquire a sensing voltage by sensing the reference line and determine presence or absence of a defect based on the sensing voltage.

The sampling switch may continuously maintain a turn-on state during the image display period of the display panel.

The sampling switch may maintain a turn-on state after temporarily having a turn-off state during the image display period of the display panel.

The sampling switch may be temporarily turned off in response to a period for changing a scale of the sensing voltage.

The sensing circuit may further include an analog-to-digital converter configured to digitize the sensing voltage, and the period for changing the scale of the sensing voltage may be defined as a period for changing a voltage applied to the analog-to-digital converter.

The period for changing the scale of the sensing voltage may be defined as a scale-down period in which the voltage applied to the analog-to-digital converter is changed from a high voltage to a low voltage.

The sampling switch may be temporarily turned on before a scan signal is applied to the display panel and the data voltage is applied to the data line.

The sensing circuit may acquire the sensing voltage within a generation period of a first scan signal applied to a first gate line of the display panel.

In another aspect of the present disclosure, a display device includes a display panel including a sub-pixel connected to a data line and a reference line, a driving circuit configured to supply a data voltage to the display panel through the data line, and a sensing circuit including a sampling circuit for sensing the display panel through the reference line, wherein the sampling circuit includes a sampling capacitor configured to continuously maintain charge sharing with a sensing capacitor formed on the reference line, and the sensing circuit acquires a sensing voltage from the sampling capacitor, and determines presence or absence of a defect based on the sensing voltage.

In another aspect of the present disclosure, a method of driving a display device includes charging a data line of a sub-pixel included in a display panel with a data voltage, charging a reference line of the sub-pixel included in the display panel with a reference voltage, and turning on a sampling switch included in a sampling circuit of a sensing circuit to acquire a sensing voltage through the reference voltage, wherein the sampling switch has a turn-on state within an image display period of the display panel.

The sampling switch may continuously maintain the turn-on state during the image display period of the display panel.

The sampling switch may maintain the turn-on state after temporarily having a turn-off state during the image display period of the display panel.

The sampling switch may be temporarily turned off in response to a period for changing a scale of the sensing voltage.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect (s) of the disclosure and together with the description serve to explain the principle of the disclosure. In the drawings.

DETAILED DESCRIPTION

Reference will now be made in detail to the preferred aspects of the present disclosure, examples of which are illustrated in the accompanying drawings. Wherever possible, the same reference numbers will be used throughout the drawings to refer to the same or like parts.

A display device according to the present disclosure may be implemented as a television, a video player, a personal computer (PC), a home theater, an automotive electric device, or a smartphone, but is not limited thereto. The display device according to the present disclosure may be implemented as a light emitting diode (LED), a quantum dot display (QDD), or a liquid crystal display (LCD). For convenience of description, an LED device that directly emits light based on an inorganic light-emitting diode or an organic light-emitting diode will hereinafter be taken as an example of the display device according to the present disclosure.

Figure 1:
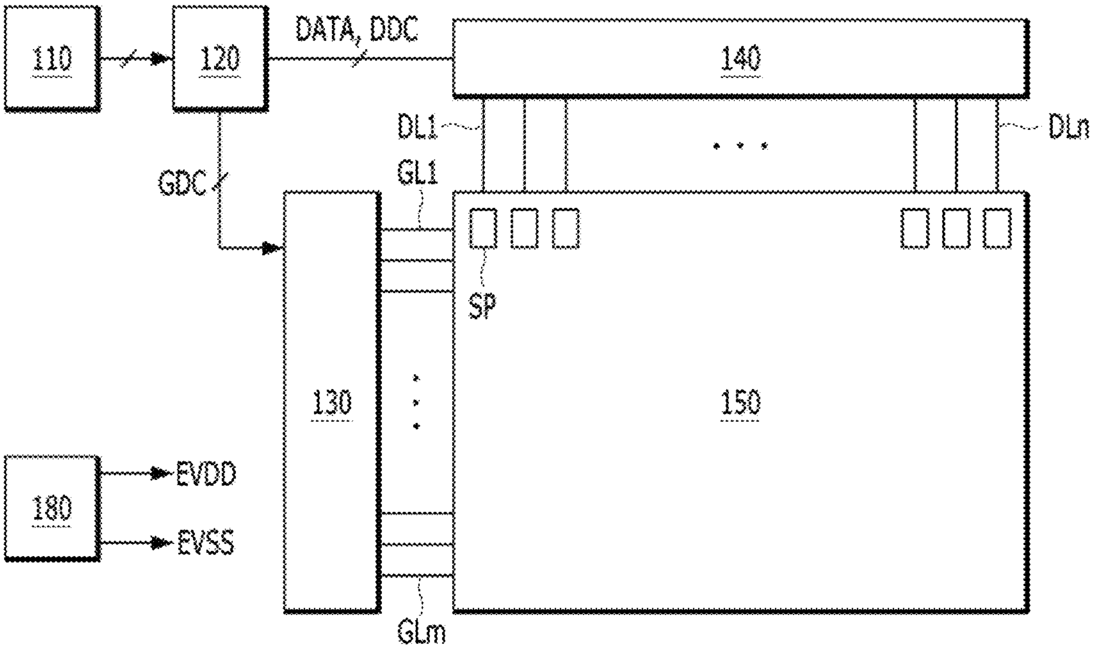
FIG. 1 is a block diagram schematically illustrating a configuration of a light emitting diode (LED) device.
Figure 2:
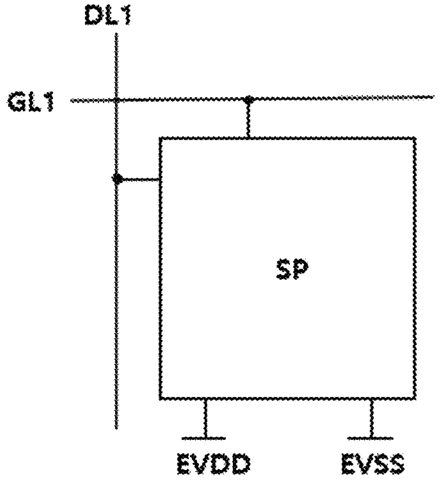
FIG. 2 is a configuration diagram schematically illustrating a sub-pixel illustrated in FIG. 1.
Figure 3:
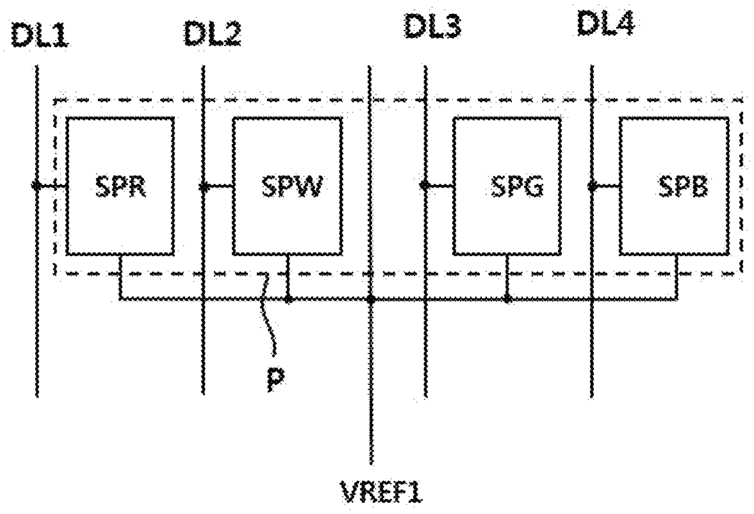
FIG. 3 is an exemplary diagram of a pixel including sub-pixels.

FIG. 1 is a block diagram schematically illustrating a configuration of an LED device, FIG. 2 is a configuration diagram of a sub-pixel illustrated in FIG. 1, and FIG. 3 is an exemplary diagram of a pixel including sub-pixels.

As illustrated in FIGS. 1 to 3, the LED device may include an image supply 110, a timing controller 120, a scan driver 130, a data driver 140, a display panel 150, and a power supply 180.

The image supply (set or host system) 110 may output various driving signals together with an externally-supplied image data signal or an image data signal stored in an internal memory. The image supply 110 may supply the data signal and the various driving signals to the timing controller 120.

The timing controller 120 may output a gate timing control signal GDC for control of operation timing of the scan driver 130, a data timing control signal DDC for control of operation timing of the data driver 140, and various synchronization signals (e.g., a vertical synchronization signal Vsync and a horizontal synchronization signal Hsync). The timing controller 120 may supply a data signal DATA supplied from the image supply 110 together with the data timing control signal DDC to the data driver 140. The timing controller 120 may be an integrated circuit (IC) and mounted on a printed circuit board, but is not limited thereto.

The scan driver 130 may output a scan signal (or scan voltage) in response to the gate timing control signal GDC that is supplied from the timing controller 120. The scan driver 130 may supply the scan signal to sub-pixels included in the display panel 150 through gate lines GL1 to GLm. The scan driver 130 may take the form of an IC or may be formed directly on the display panel 150 using a gate-in-panel (GIP) technique, but is not limited thereto.

The data driver 140 may sample and latch the data signal DATA in response to the data timing control signal DDC that is supplied from the timing controller 120, convert the resulting digital data signal into an analog data voltage based on a gamma reference voltage, and output the converted analog data voltage. The data driver 140 may supply the data voltage to the sub-pixels included in the display panel 150 through data lines DL1 to DLn. The data driver 140 may be an IC and mounted on the display panel 150 or mounted on the printed circuit board, but is not limited thereto.

The power supply 180 may generate a first power having a high potential and a second power having a low potential based on an external input voltage. The power supply 180 may output the first power through a first power line EVDD and output the second power through a second power line EVSS. The power supply 180 may generate and output a voltage (for example, a scan high voltage and a scan low voltage) to drive the scan driver 130 or a voltage (for example, a drain voltage and a half-drain voltage) to drive the data driver 140, as well as the first power and the second power.

The display panel 150 may display an image in response to a driving signal including the scan signal and the data voltage, the first power, and the second power. The sub-pixels of the display panel 150 may directly emit light. The display panel 150 may be manufactured based on a rigid or flexible substrate of glass, silicon, polyimide, etc. For example, one sub-pixel SP may be connected to a first data line DL1, a first gate line GL1, a first power line EVDD, and a second power line EVSS, and may include a pixel circuit which is composed of a switching transistor, a driving transistor, a capacitor, an organic light-emitting diode, etc.

The sub-pixel SP in the LED device directly emits light, and thus a circuit configuration is complicated. In addition, there are various compensation circuits for compensating for deterioration of an organic light-emitting diode that emits light as well as a driving transistor that supplies driving current to drive the organic light-emitting diode. For purposes of clarity, the sub-pixel SP is illustrated in the form of a block and is understood in include a circuit to control the various components.

The sub-pixels can have various configuration to emit light, and may include red, green and blue sub-pixels or may include red, green, blue and white sub-pixels. For example, one pixel P may include a red sub-pixel SPR connected to the first data line DL1, a white sub-pixel SPW connected to a second data line DL2, a green sub-pixel SPG connected to a third data line DL3, and a blue sub-pixel SPB connected to a fourth data line DL4. In addition, the red sub-pixel SPR, the white sub-pixel SPW, the green sub-pixel SPG, and the blue sub-pixel SPB may be commonly connected to a first reference line VREF1. The first reference line VREF1 may be used to sense deterioration of element(s) included in the red sub-pixel SPR, the white sub-pixel SPW, the green sub-pixel SPG, and the blue sub-pixel SPB, which will be discussed below.

In other aspects, the timing controller 120, the scan driver 130, the data driver 140, etc., may have individual configurations. However, one or more of the timing controller 120, the scan driver 130 and the data driver 140 may be integrated into a single IC depending on a implementation of the LED device. In addition, in the above description, the pixel P in which the red sub-pixel SPR, the white sub-pixel SPW, the green sub-pixel SPG, and the blue sub-pixel SPB are disposed in this order is as an example. However, an arrangement order and direction of sub-pixels may vary depending on the implementation of the LED device.

Figure 4:
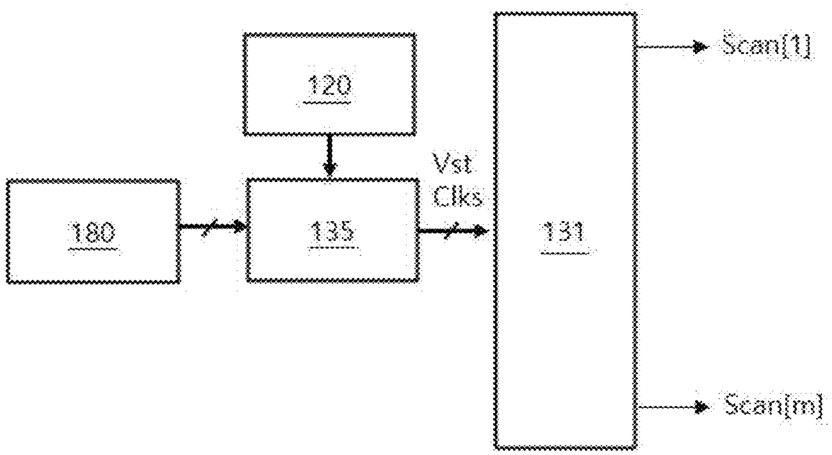
FIGS. 4 and 5 are diagrams illustrating examples of a configuration of a gate-in-panel (GIP)-type scan driver.
Figure 5:
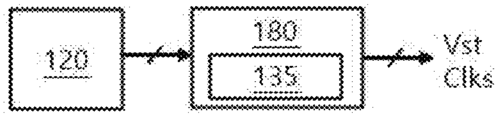
Figure 6:
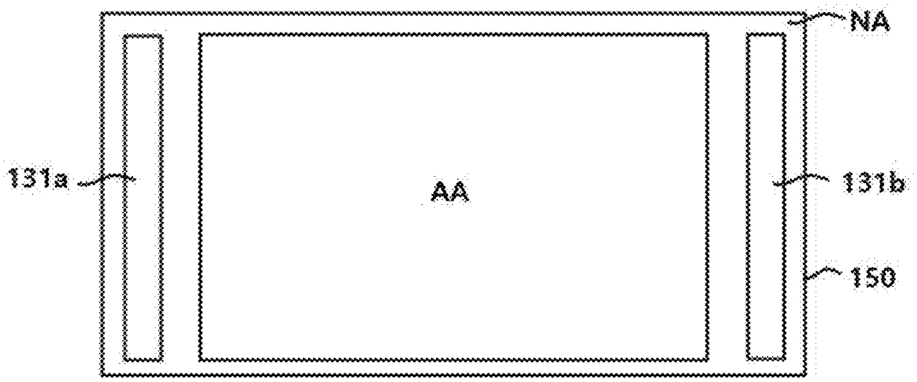
FIG. 6 is a diagram illustrating a layout example of the GIP-type scan driver.

FIGS. 4 and 5 are diagrams for describing a configuration of a GIP-type scan driver, and FIG. 6 is a diagram illustrating a layout example of the GIP-type scan driver.

As illustrated in FIG. 4, the GIP-type scan driver may include a shift register 131 and a level shifter 135. The level shifter 135 may generate driving clock signals Clks and a start signal Vst based on signals and voltages output from the timing controller 120 and the power supply 180.

The shift register 131 may operate based on the signals Clks and Vst output from the level shifter 135 and output scan signals Scan[1] to Scan[m] capable of turning on or off transistors formed on the display panel. The shift register 131 may be formed on the display panel in the form of a thin film in a GIP manner.

As illustrated in FIGS. 4 and 5, the level shifter 135 may independently be an IC or may be included in the power supply 180. However, this is merely one example, and the level shifter 135 is not limited thereto.

As illustrated in FIG. 6, in the GIP-type scan driver, shift registers 131*a* and 131*b* for outputting scan signals may be disposed in a non-display area NA of the display panel 150. In one aspect, the shift registers 131*a* and 131*b* are disposed in the non-display area NA on the left and right sides. However, the shift registers 131*a* and 131*b* may be disposed in the non-display area NA on upper and lower sides of the display panel 150 and may be disposed in a display area AA of the display panel 150.

Figure 7:
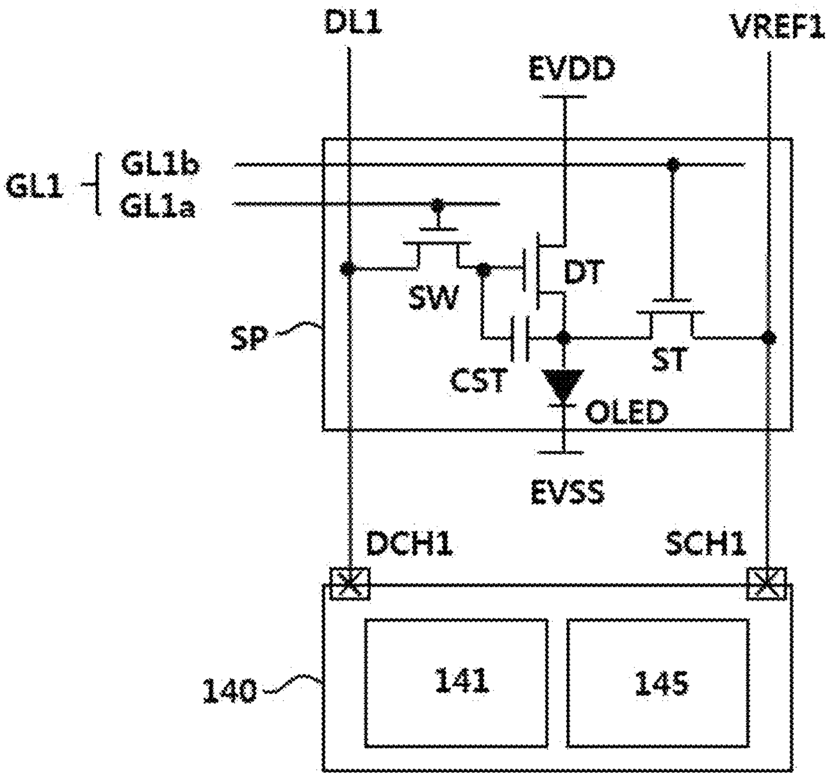
FIGS. 7 and 8 are exemplary diagrams illustrating a sub-pixel and a data driver according to a first aspect of the present disclosure.
Figure 8:
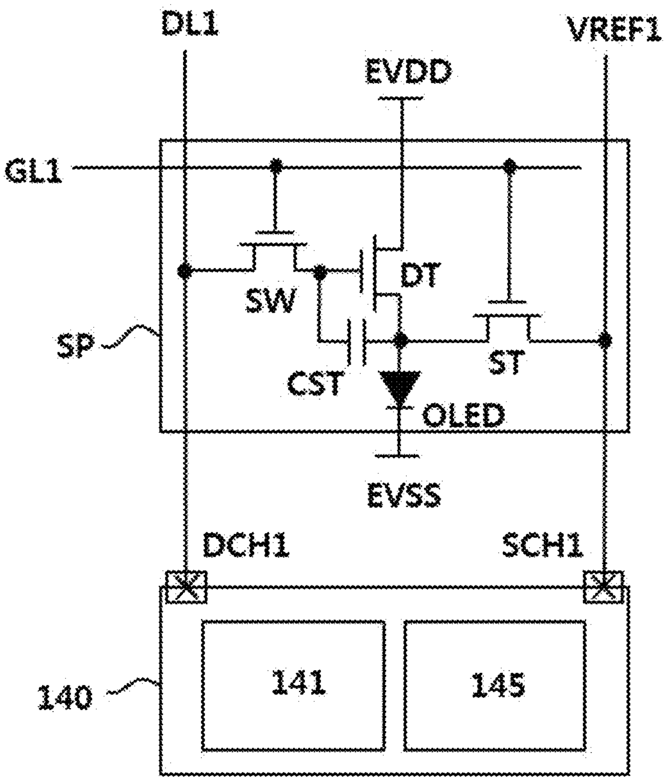
Figure 9:
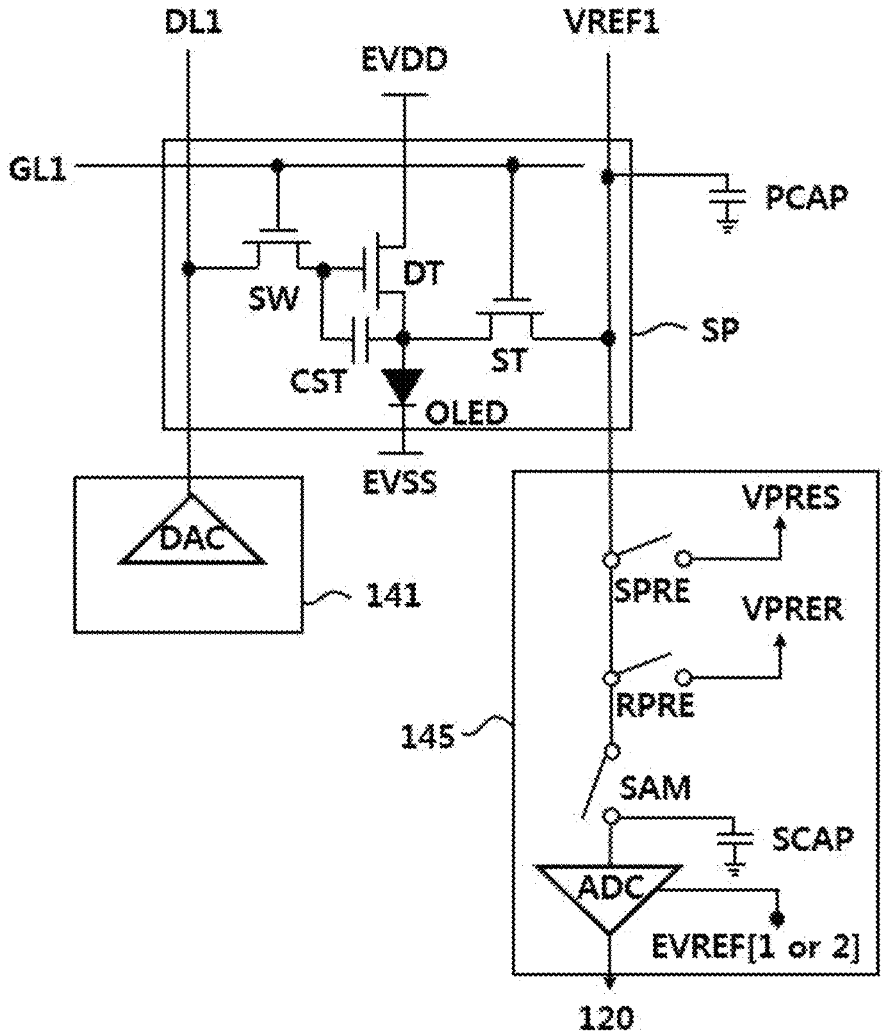
FIG. 9 is a diagram more specifically illustrating a configuration included in the data driver according to the first aspect of the present disclosure.

FIGS. 7 and 8 are exemplary diagrams illustrating a sub-pixel and a data driver according to a first aspect of the present disclosure, and FIG. 9 is a diagram more specifically illustrating a configuration included in the data driver according to the first aspect of the present disclosure.

As illustrated in FIGS. 7 and 8, a sub-pixel SP may include a switching transistor TR, a driving transistor DT, a sensing transistor ST, a capacitor CST, and an organic LED (OLED).

The driving transistor DT may have a gate electrode connected to a first electrode of the capacitor CST, a first electrode connected to the first power line EVDD, and a second electrode connected to an anode electrode of the organic light-emitting diode OLED. The capacitor CST may have the first electrode connected to the gate electrode of the driving transistor DT and a second electrode connected to the anode electrode of the organic light-emitting diode OLED. The organic light-emitting diode OLED may have the anode electrode connected to the second electrode of the driving transistor DT and a cathode electrode connected to the second power line EVSS.

The switching transistor TR may have a gate electrode connected to a first scan line GL1*a* included in the first gate line GL1, a first electrode connected to the first data line DL1, and a second electrode connected to the gate electrode of the driving transistor DT. The sensing transistor ST may have a gate electrode connected to a second scan line GL1*b* included in the first gate line GL1, a first electrode connected to the first reference line VREF1, and a second electrode connected to the anode electrode of the organic light-emitting diode OLED.

The sensing transistor ST is a compensation circuit which compensates for deterioration of a threshold voltage, mobility, etc. of the driving transistor DT or organic light-emitting diode OLED. The sensing transistor ST may sense the physical threshold voltage based on a source follower operation of the driving transistor DT. The sensing transistor ST may acquire a sensed value through a sensing node defined between the driving transistor DT and the organic light-emitting diode OLED.

The first gate line GL1 may be integrated into a single line as illustrated in FIG. 8. In this case, the switching transistor SW and the sensing transistor ST may be connected in common to the first gate line GL1 and turned on or off at the same time.

The data driver 140 may include a driving circuit unit 141 for driving the sub-pixel SP and a sensing circuit unit 145 for sensing the sub-pixel SP. The driving circuit unit 141 may be connected to the first data line DL1 through a first data channel DCH1 and connected to the first reference line VREF1 through a first sensing channel SCH1. The driving circuit unit 141 may output a data voltage for driving the sub-pixel SP through the first data channel DCH1. The sensing circuit unit 145 may acquire a sensing voltage sensed from the sub-pixel SP through the first sensing channel SCH1.

As illustrated in FIG. 9, the driving circuit unit 141 may include a digital-to-analog converter DAC to output a data voltage for sensing, a black data voltage, or a data voltage for display. The sensing circuit unit 145 may include a first voltage circuit unit SPRE, a second voltage circuit unit RPRE, a sampling circuit unit SAM, an analog-to-digital converter ADC), etc. to output a voltage to the sub-pixel SP and the first reference line VREF1 and perform sensing.

The first voltage circuit unit SPRE and the second voltage circuit unit RPRE may each perform a voltage output operation for initializing a node or circuit included in the sub-pixel SP or charging the node or circuit with a voltage at a specific level. The first voltage circuit unit SPRE and the second voltage circuit unit RPRE may include a first reference voltage source VPRES and a second reference voltage source VPRER, respectively. The first voltage circuit unit SPRE may output a first reference voltage based on the first reference voltage source VPRES, and the second voltage circuit unit RPRE may output a second reference voltage based on the second reference voltage source VPRER. The first reference voltage may be used in a sensing mode (e.g., a compensation mode) for deterioration compensation, and the second reference voltage may be a voltage used in a driving mode (normal mode) for image display. In addition, the first reference voltage may be set to a voltage lower than the second reference voltage.

The sampling circuit unit SAM may perform a sampling operation to obtain a sensing voltage through the first reference line VREF1. The analog-to-digital converter ADC may convert an analog sensing voltage acquired by the sampling circuit unit SAM into a digital sensing voltage and output the converted sensing voltage. The analog-to-digital converter ADC may use a first voltage source or a second voltage source EVREF[1 or 2] to change the scale of the sensing voltage (e.g., increase or decrease) stored in a sampling capacitor SCAP.

For example, the analog-to-digital converter ADC may convert a voltage from the second voltage source EVREF [2] to the first voltage source EVREF [1] to scale down the sensing voltage stored in the sampling capacitor SCAP. The first voltage source EVREF [1] may have a low voltage level, and the second voltage source EVREF [2] may have a higher voltage level than that of the first voltage source EVREF [1]. Therefore, a period for changing a voltage supply of the analog-to-digital converter (ADC) to change the sensing voltage may be an ADC transition period or a low voltage transition period.

The sensing circuit unit 145 may acquire a sensing voltage for compensating for deterioration of the driving transistor DT or the organic light-emitting diode OLED included in the sub-pixel SP through a sensing capacitor PCAP formed on the first reference line VREF1. The sensing circuit unit 145 may acquire a sensing voltage by sampling capacitor SCAP in the sampling circuit unit SAM, converting the acquired analog sensing voltage into a digital sensing voltage using the analog-to-digital converter ADC, and outputting the digital sensing voltage. The digital sensing voltage output from the sensing circuit unit 145 may be transferred to the timing controller 120. Further, the timing controller 120 may determine whether or not the driving transistor DT or the organic light-emitting diode OLED included in the sub-pixel SP has deteriorated based on the sensing voltage, and may compensate for the deterioration.

Figure 10:
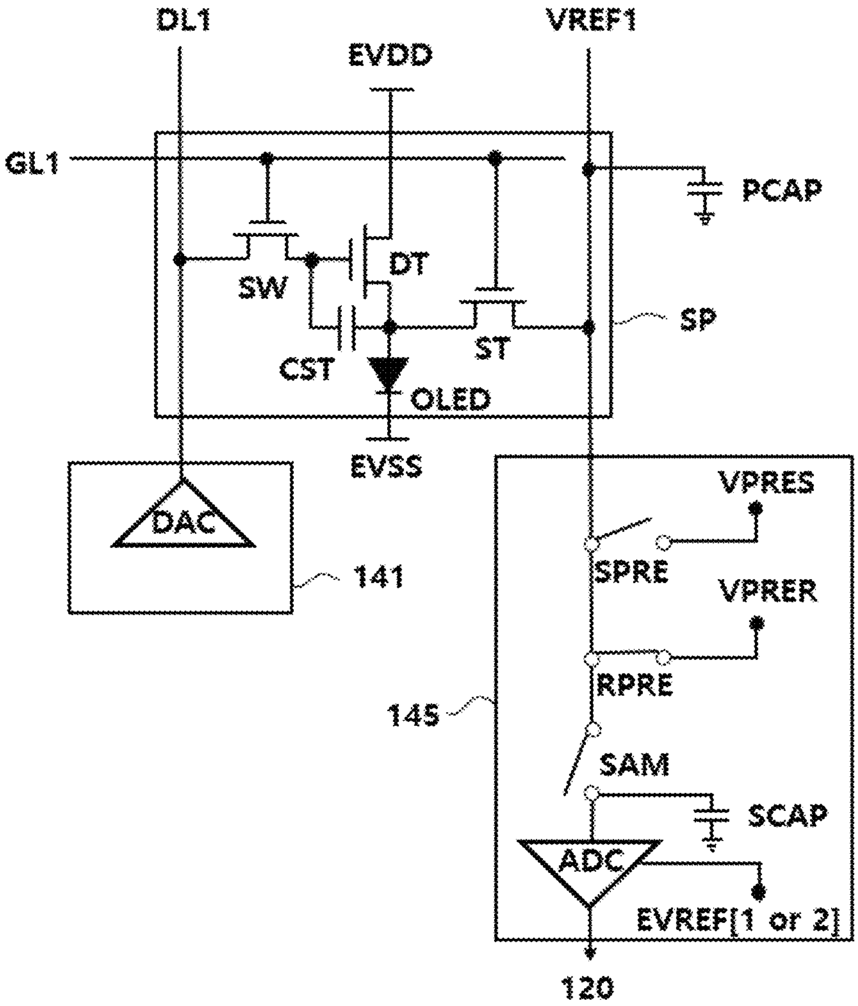
FIGS. 10 and 11 are diagrams for describing a driving mode of the LED device implemented according to the first aspect of the present disclosure.
Figure 11:
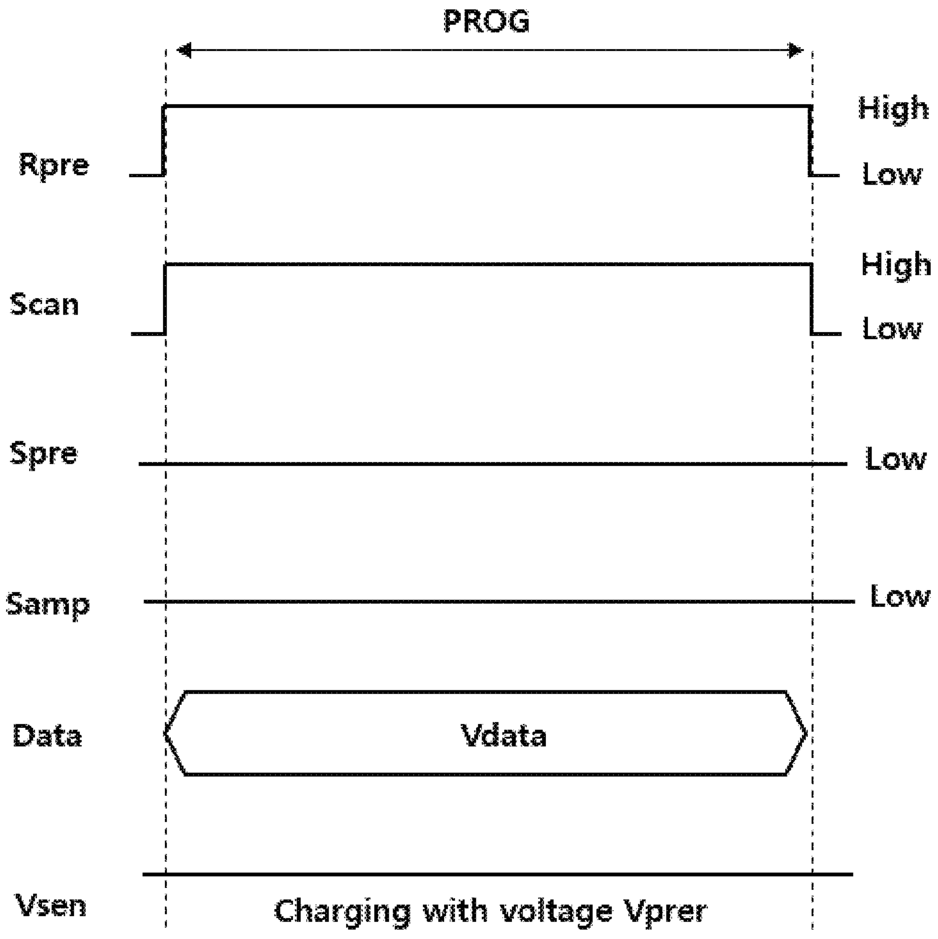

FIGS. 10 and 11 are diagrams for describing a driving mode of the LED device implemented according to the first aspect of the present disclosure.

As illustrated in FIGS. 10 and 11, the LED device implemented according to the first aspect of the present disclosure may operate in a driving mode (e.g., a normal mode) for displaying an image. In the driving mode (normal mode), a display data voltage Vdata may be applied to operate the device. The driving mode (normal mode) may include a first sensing mode including different periods such as a programming period PROG.

Operations of devices performed during the programming period PROG will be described below. A switch included in the second voltage circuit unit RPRE may be turned on to output the second reference voltage through the first reference line VREF1 in response to a second voltage control signal Rpre at a high voltage. The switching transistor SW and the sensing transistor ST may be turned on in response to a scan signal Scan at a high voltage. The digital-to-analog converter DAC included in the driving circuit unit 141 may output the display data voltage Vdata through the first data line DL1.

A sensing operation may not be performed during a period in which the driving mode (normal mode) is performed. Accordingly, a switch included in the first voltage circuit unit SPRE may be turned off in response to a first voltage control signal Spre at a low voltage. Further, a sampling switch included in the sampling circuit unit SAM may be turned off in response to a sampling control signal Samp at a low voltage. As a result, the sensing capacitor PCAP formed on the first reference line VREF1 may be charged with a second reference voltage Vprer.

When the programming period PROG is completed, the driving transistor DT may be turned on by a voltage with which the capacitor CST is charged to generate a driving current. Further, the organic light-emitting diode OLED may emit light in response to the driving current.

Figure 12:
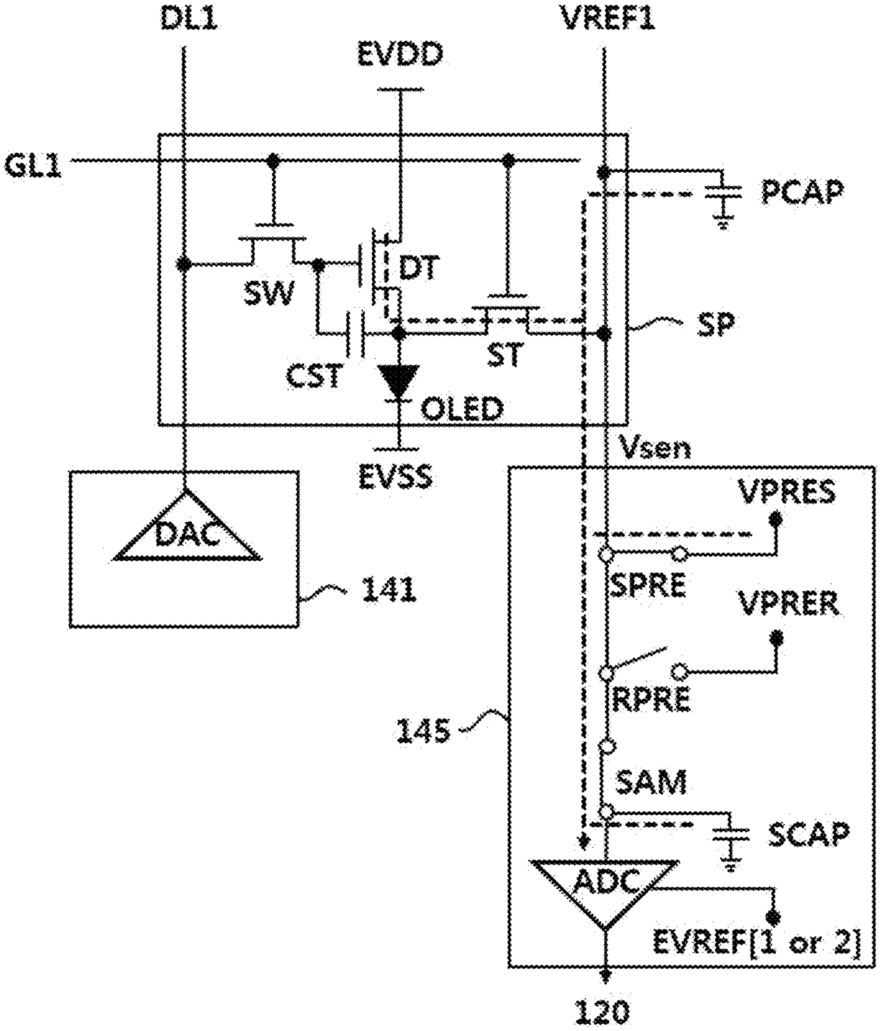
FIGS. 12 and 13 are diagrams for describing a first sensing mode of the LED device implemented according to the first aspect of the present disclosure.
Figure 13:
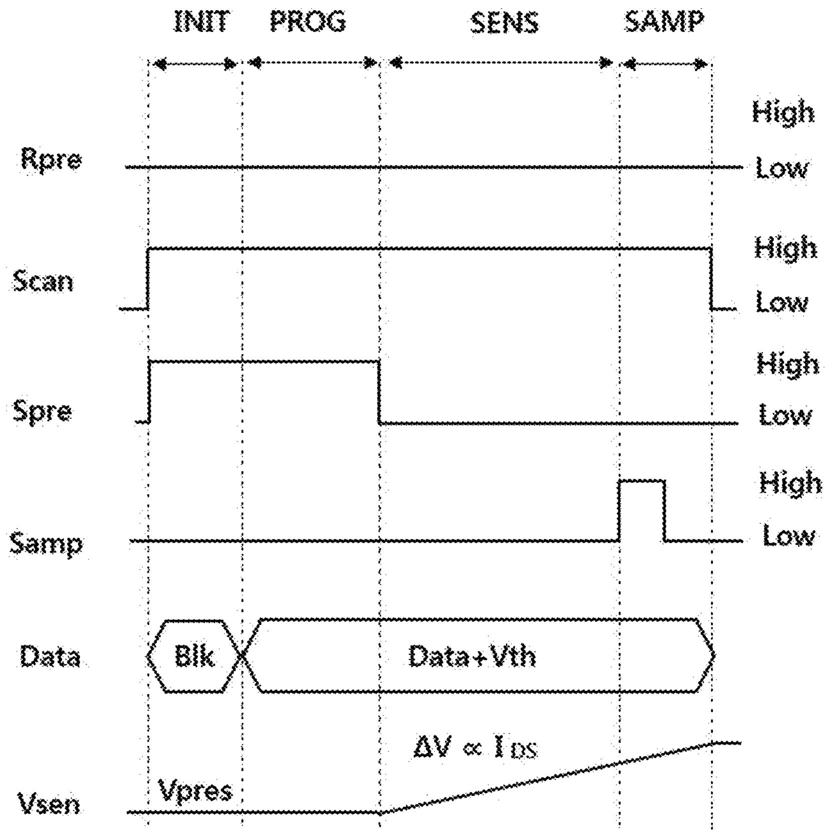

FIGS. 12 and 13 are diagrams for describing a first sensing mode of the LED device implemented according to the first aspect of the present disclosure.

As illustrated in FIGS. 12 and 13, the LED device implemented according to the first aspect of the present disclosure may operate in a first sensing mode (mobility compensation mode) for compensating for deterioration (e.g., mobility compensation) of the driving transistor DT. In the first sensing mode (mobility compensation mode), a black data voltage Blk and a sensing data voltage Data+Vth may be applied to operate the device.

The first sensing mode (mobility compensation mode) may include an initialization period INIT, a programming period PROG, a sensing period SENS, and a sampling period SAMP. In this example, a voltage obtained by compensating for a change in a threshold voltage Vth to sense mobility of the driving transistor DT is illustrated as an example of the sensing data voltage Data+Vth.

Operations of the devices performed in the initialization period INIT, the programming period PROG, the sensing period SENS, and the sampling period SAMP will be described below. The switch included in the first voltage circuit unit SPRE may be turned on during the initialization period INIT and the programming period PROG to output the first reference voltage through the first reference line VREF1 in response to the first voltage control signal Spre at the high voltage. The switching transistor SW and the sensing transistor ST may be turned on during the initialization period INIT or the sampling period SAMP in response to the scan signal Scan at the high voltage.

The digital-to-analog converter DAC included in the driving circuit unit 141 may output the black data voltage Blk (or initialization voltage) through the first data line DL1 during the initialization period INIT. Further, the digital-to-analog converter DAC included in the driving circuit unit 141 may output the sensing data voltage Data+Vth through the first data line DL1 during the programming period PROG to the sampling period SAMP. In response to a high voltage in the sampling control signal Samp, the sampling switch included in the sampling circuit unit SAM may be temporarily turned on during the beginning of the sampling period SAMP.

In this case, a display operation may not be performed during a period in which the first sensing mode (mobility compensation mode) is performed. Accordingly, a low voltage may turn off the switch included in the second voltage circuit unit RPRE during the initialization period INIT to the sampling period SAMP in response to the second voltage control signal Rpre.

During the sensing period SENS of the first sensing mode (mobility compensation mode), the sensing data voltage Data is applied through a gate node of the driving transistor DT. However, the sensing node may be in a floating state. In this case, a voltage of the driving transistor DT may increase until reaching a saturation state by a source following operation. However, since the first sensing mode (mobility compensation mode) is configured to sense the mobility of the driving transistor DT, the amount of change in voltage ($\Delta V \propto I_{DS}$) with which the sensing node is charged during a linear operation period of the driving transistor DT is sensed.

The sensing capacitor PCAP formed on the first reference line VREF1 may be charged with the amount of change in voltage ($\Delta V \propto I_{DS}$) with which the sensing node is charged. Accordingly, when the sampling switch included in the sampling circuit unit SAM is turned on, the mobility of the driving transistor DT may be acquired as the sensing voltage Vsen and stored in the sampling capacitor SCAP.

Meanwhile, in the above description, the mobility compensation mode of the driving transistor DT is illustrated as the first sensing mode. However, the first sensing mode may include a threshold voltage compensation mode for compensating a threshold voltage of at least one of the driving transistor DT or the organic light-emitting diode OLED.

Figure 14:
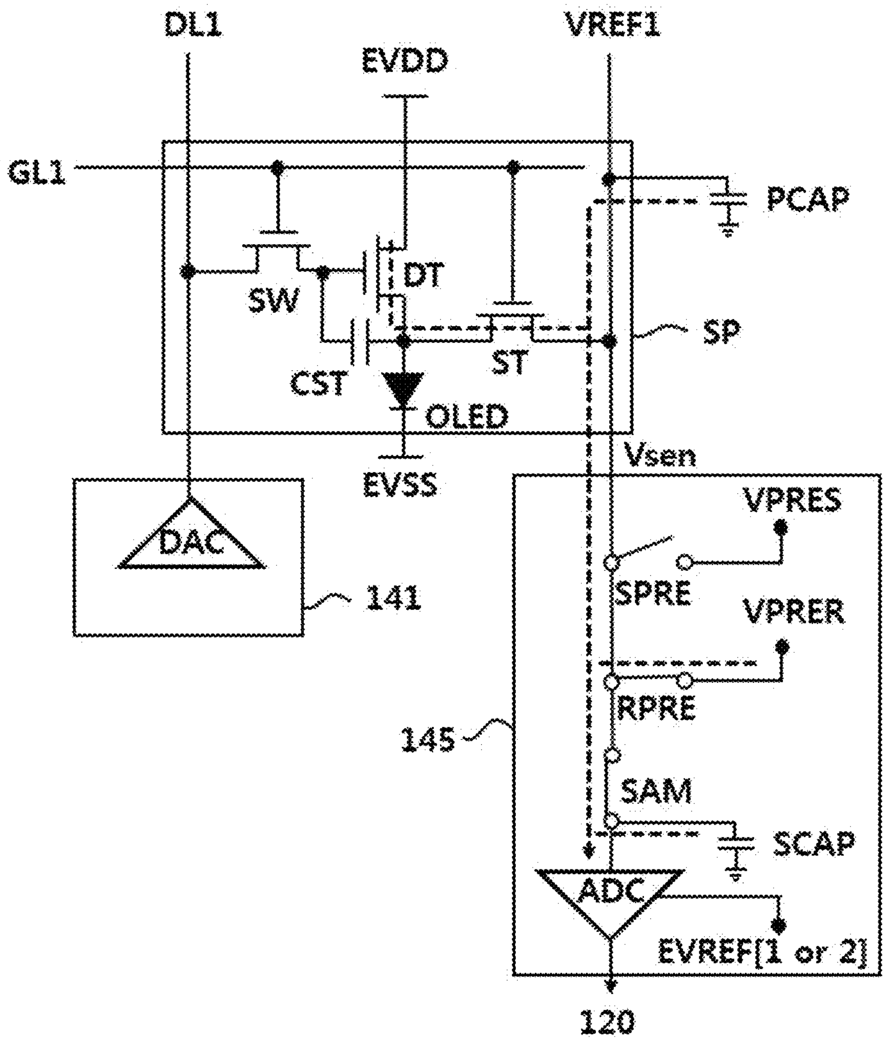
FIGS. 14 and 15 are diagrams for describing a second sensing mode of the LED device implemented according to the first aspect of the present disclosure.
Figure 15:
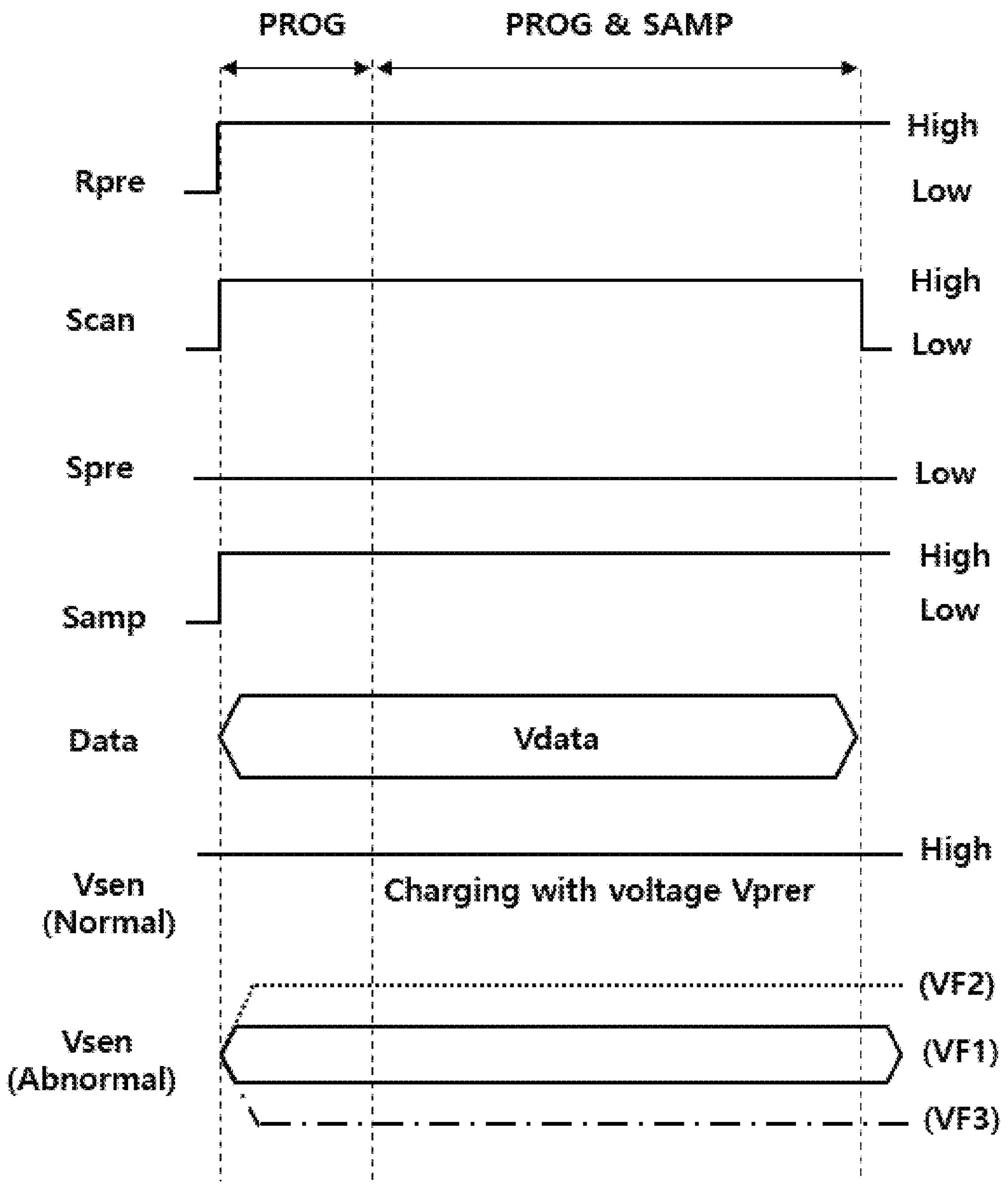

FIGS. 14 and 15 are diagrams for describing a second sensing mode of the LED device implemented according to the first aspect of the present disclosure.

As illustrated in FIGS. 14 and 15, the LED device implemented according to the first aspect of the present disclosure may operate in the second sensing mode (e.g., a defect detection mode) for detecting presence or absence of an abnormality or defect in the entire display panel during a period in which the driving mode (normal mode) is performed. For example, the second sensing mode can occur during an image display period in which a frame is output by the sub-pixels. That is, it is possible to sense the presence or absence of an abnormality or defect in the device in real time.

In the second sensing mode (defect detection mode), the display data voltage Vdata may be applied as in the driving mode (normal mode). However, unlike the driving mode (normal mode), the second sensing mode (defect detection mode) may further include a programming and sampling period PROG & SAMP as well as the programming period PROG.

Operations of the devices in the programming period PROG and the programming and sampling period PROG & SAMP are similar to those in the driving mode (normal mode). However, the sampling switch included in the sampling circuit unit SAM maintains a turned-on state in response to the sampling control signal Samp during the programming period PROG and the programming and sampling period PROG & SAMP. In other words, the sampling switch included in the sampling circuit unit SAM may continuously maintain a turned-on state during an image display period of the display panel.

The sampling switch included in the sampling circuit unit SAM maintains a turned-on state and may cause the sensing voltage Vsen stored in the sensing capacitor PCAP formed on the first reference line VREF1 to be stored in the sampling capacitor SCAP.

When the entire display panel (or the display module including the driver) is in a normal state, the sensing voltage Vsen may be charged with the second reference voltage Vprer, that is, in the form of the second reference voltage Vprer. However, when the entire display panel is in an abnormal state, the sensing voltage Vsen may be a first abnormal voltage VF1, a second abnormal voltage VF2, a third abnormal voltage VF3, etc., and not charged with the second reference voltage Vprer.

Sensing the first abnormal voltage VF1 may indicate that the second reference voltage Vprer is sensed differently from an applied voltage (or set value). For example, when the first abnormal voltage VF1 is sensed, a crack may have occurred in the display panel. In addition, when the first abnormal voltage VF1 is sensed, the power may be in a fluctuating state due to abnormal driving of a power circuit related to the reference voltage.

Sensing the second abnormal voltage VF2 may indicate that the driving transistor DT is in an abnormal state. For example, when the second abnormal voltage VF2 is sensed, a short circuit may have occurred between the source electrode and the drain electrode of the driving transistor DT.

Sensing the third abnormal voltage VF3 may indicate that the organic light-emitting diode OLED is in an abnormal state. For example, when the third abnormal voltage VF3 is sensed, a short circuit may have occurred between both ends of the organic light-emitting diode OLED or between one end thereof and another electrode.

As described above, when the first abnormal voltage VF1, the second abnormal voltage VF2, or the third abnormal voltage VF3 is sensed, abnormal screen display or a hazardous condition may occur in the display panel (for example, a electrical fire can start and may melt the polarizer). Accordingly, when an abnormal voltage is obtained, an operation of the device may be suspended or all operations of the device may be forcibly terminated after a related message is displayed on a screen.

Meanwhile, the second sensing mode (defect detection mode) may be performed randomly or once at a specific time set inside the device, for example, at an Nth frame (N being an integer equal to or greater than 2) during a period in which the driving mode (normal mode) is performed. However, it is preferable that the second sensing mode (defect detection mode) is performed when a voltage of the first reference line VREF1 is stable.

As can be seen from the above-described operation, the sensing capacitor PCAP and the sampling capacitor SCAP are in a charge sharing state by the turned-on sampling circuit unit SAM. For this reason, when a voltage supplied to the analog-to-digital converter ADC changes, a voltage shared by the first reference line VREF1 may become unstable.

Therefore, since the second sensing mode (defect detection mode) detects the presence or absence of an abnormality or defect of the device based on a direct current (DC) voltage, it is preferable to avoid a period in which the voltage fluctuates, such as a voltage supply change period of the analog-to-digital converter ADC (ADC transition period or low voltage transition period). For example, the analog-to-digital converter ADC may transition from EVREF [1] to EVREF [2] or EVREF [2] to EVREF [1] during the voltage supply change period. Therefore, it is preferable to perform the second sensing mode (defect detection mode) according to the first aspect when the voltage of the first reference line VREF1 is stable.

Figure 16:
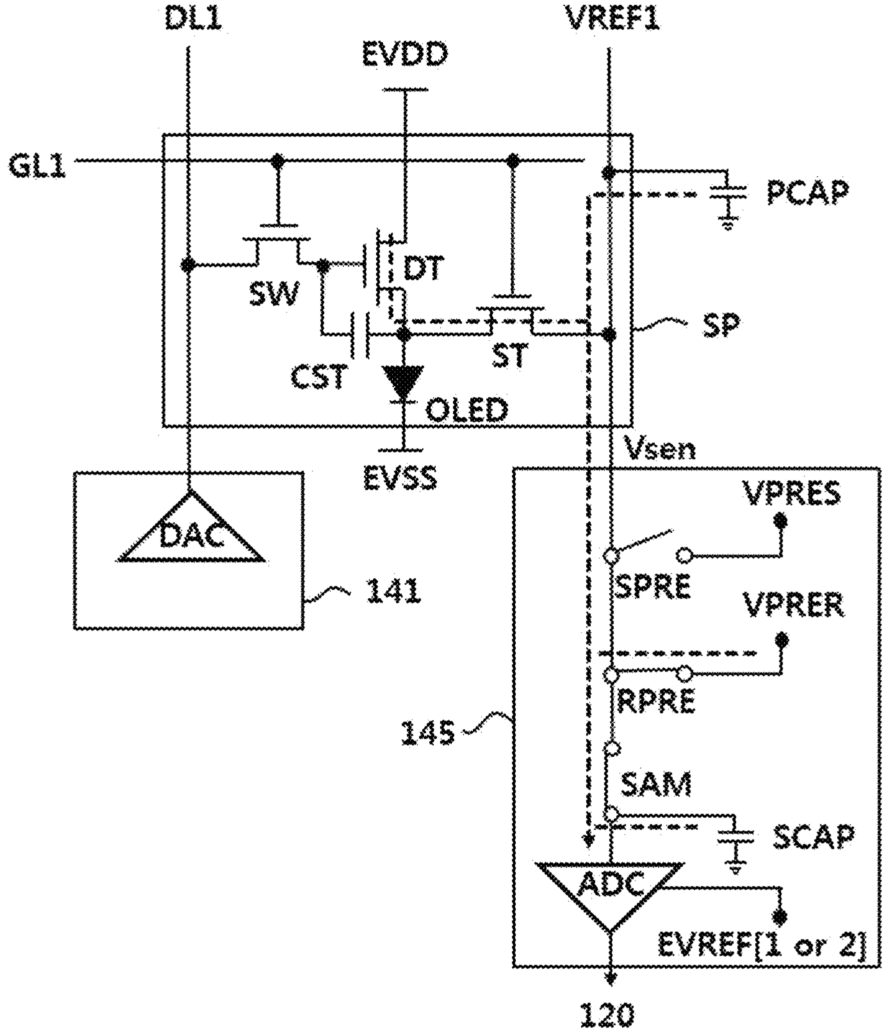
FIGS. 16 and 17 are diagrams for describing a second sensing mode of the LED device implemented according to a second aspect of the present disclosure.
Figure 17:
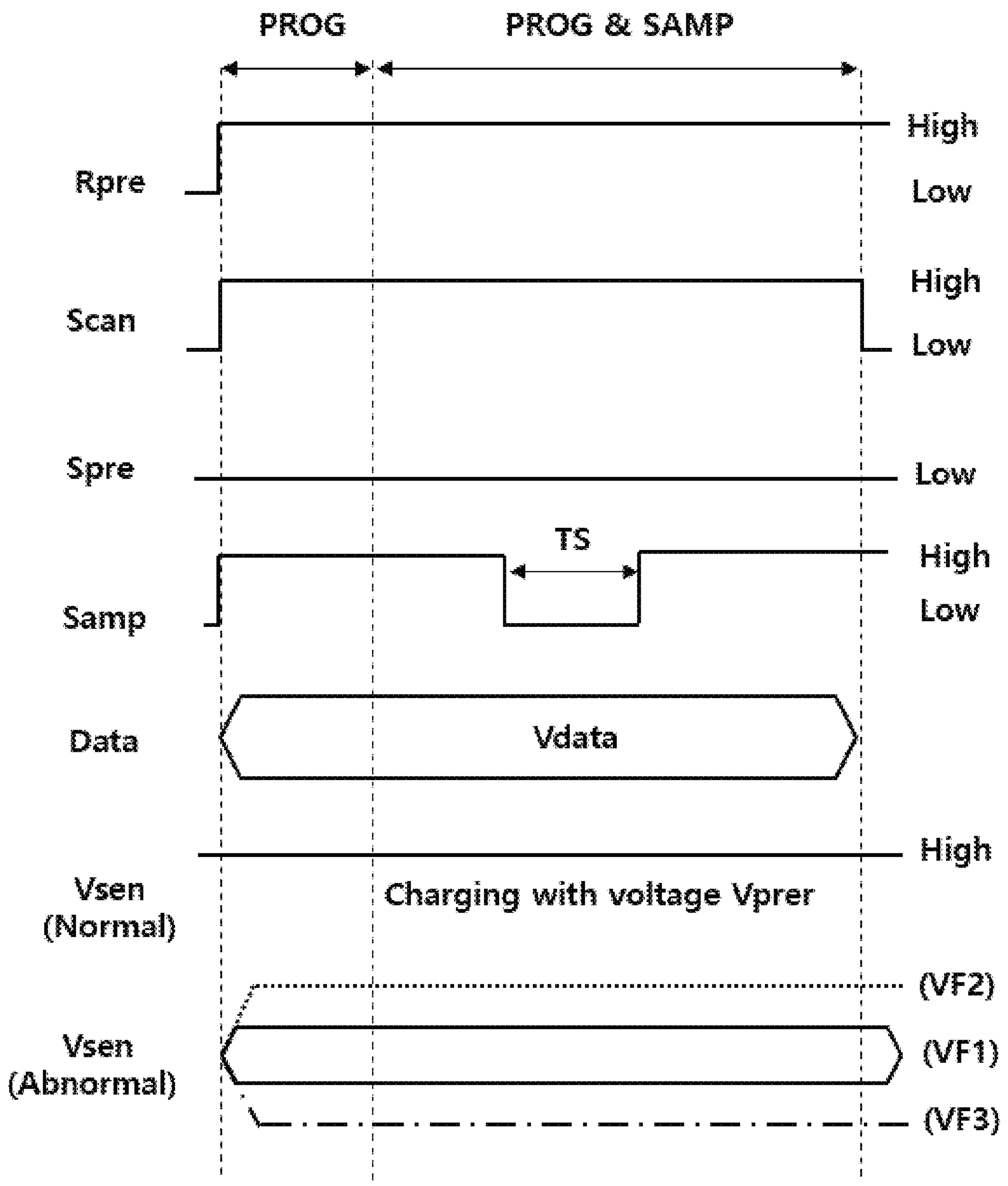

FIGS. 16 and 17 are diagrams for describing a second sensing mode of the LED device implemented according to a second aspect of the present disclosure.

As illustrated in FIGS. 16 and 17, the LED device implemented according to the second aspect of the present disclosure may operate in the second sensing mode (defect detection mode) for detecting presence or absence of an abnormality or defect in the entire display panel during a period in which the driving mode (normal mode) is performed. That is, it is possible to sense the presence or absence of an abnormality or defect in the device in real time.

The second sensing mode (defect detection mode) according to the second aspect may be performed similarly to the second sensing mode (defect detection mode) according to the first aspect. However, an operation of the sampling circuit unit SAM performed in the programming and sampling period PROG & SAMP is different.

Referring to the programming and sampling period PROG & SAMP, the sampling circuit unit SAM may not perform sampling during the voltage supply change period TS of the analog-to-digital converter ADC. To this end, the sampling control signal Samp may be changed to a high voltage after being temporarily applied as a low voltage in response to the voltage supply change period TS of the analog-to-digital converter ADC.

Therefore, the second sensing mode (defect detection mode) according to the second aspect performs sampling during a period excluding the voltage supply change period TS of the analog-to-digital converter ADC, and thus may perform sensing in an electrically stable state. Therefore, the second sensing mode (defect detection mode) according to the second aspect may be performed even when the voltage of the first reference line VREF1 is unstable.

Figure 18:
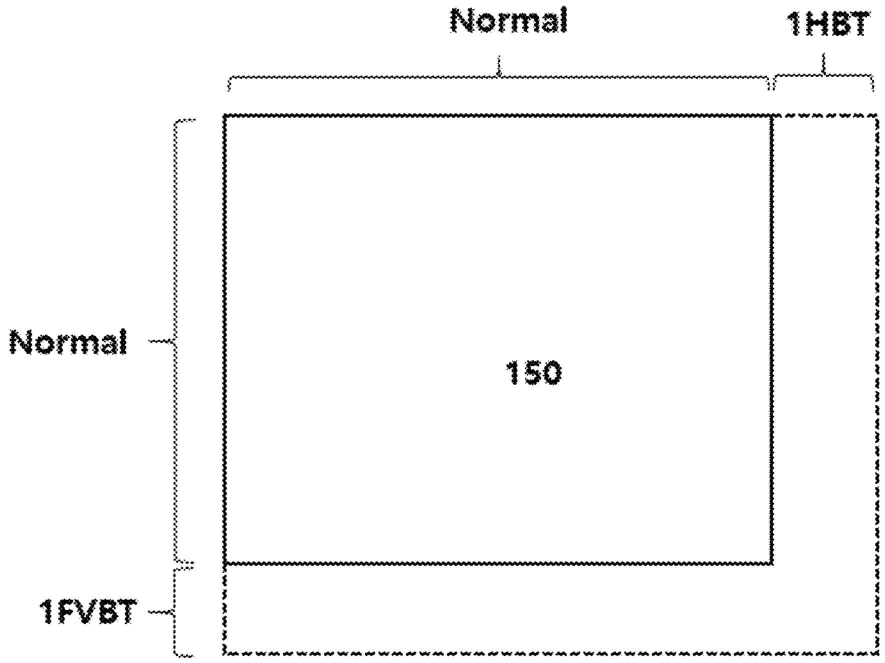
FIGS. 18 and 19 are diagrams for describing modified examples of the first aspect and the second aspect of the present disclosure.
Figure 19:
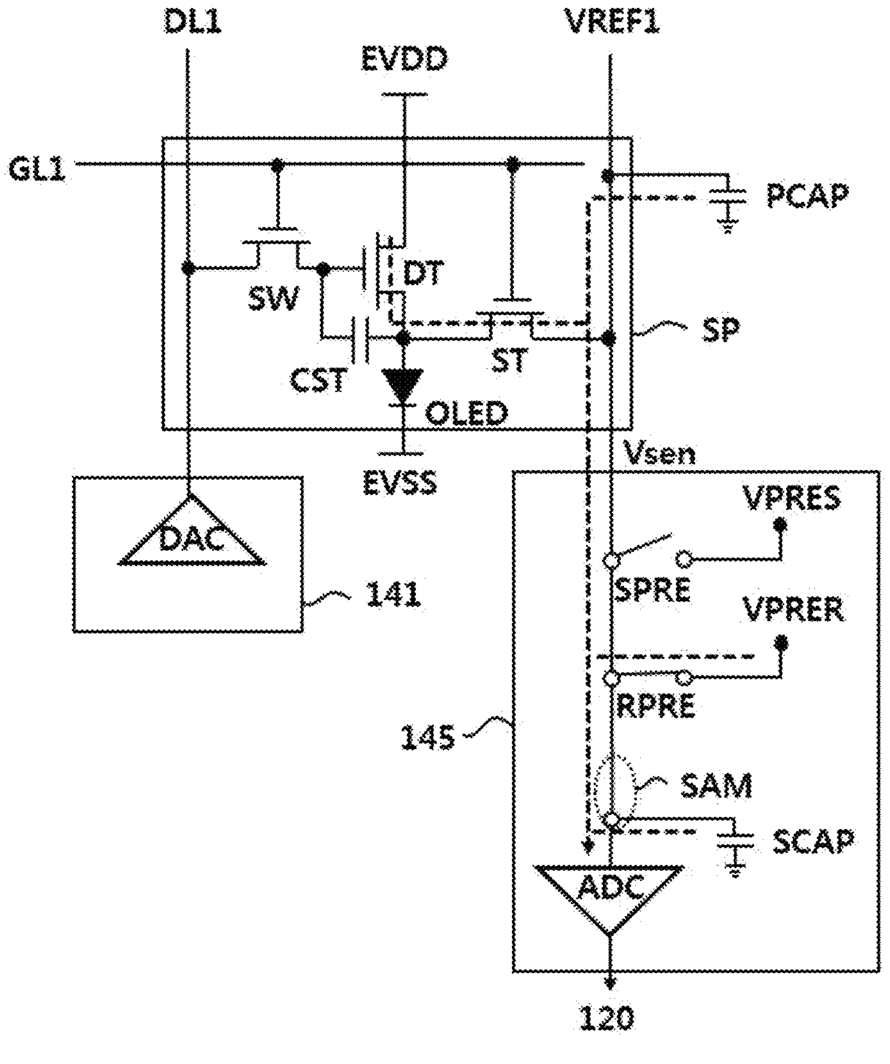

FIGS. 18 and 19 are diagrams for describing modified examples of the first aspect and the second aspect of the present disclosure.

As illustrated in FIG. 18, when the display panel 150 is driven based on the driving mode (normal mode), one horizontal blank time 1HBT may be present in a horizontal direction, and one frame vertical blank time 1FVBT may be present in a vertical direction.

The first sensing mode (mobility compensation mode) described with reference to FIGS. 12 and 13 may be performed during one frame vertical blank time 1FVBT. Unlike the first sensing mode (mobility compensation mode), the second sensing mode (defect detection mode) described with reference to FIGS. 14 and 15 and the second sensing mode (defect detection mode) described with reference to FIGS. 16 and 17 may turn on the sampling switch included in the sampling circuit unit SAM during a time excluding the one frame vertical blank time 1FVBT.

Therefore, when the device does not cause voltage instability, such as scale-down using an analog-to-digital converter ADC, the switch may be eliminated from the sampling circuit unit SAM as illustrated in FIG. 19. In this case, the first reference line VREF1 and an input terminal of the analog-to-digital converter ADC may be electrically connected to each other at all times. Further, the first reference line VREF1 and the sampling capacitor SCAP of the sampling circuit unit SAM may be in a charge sharing state at all times.

Figure 20:
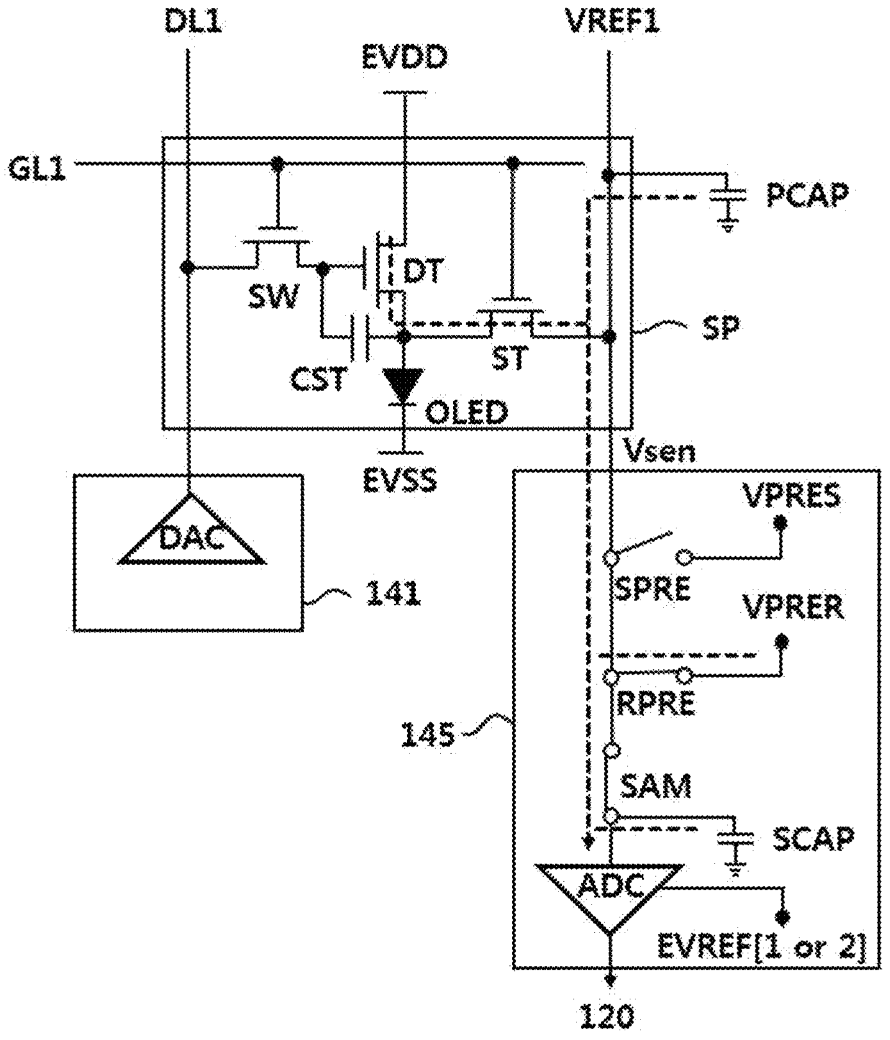
FIGS. 20 and 21 are diagrams for describing a second sensing mode of the LED device implemented according to a third aspect of the present disclosure.
Figure 21:
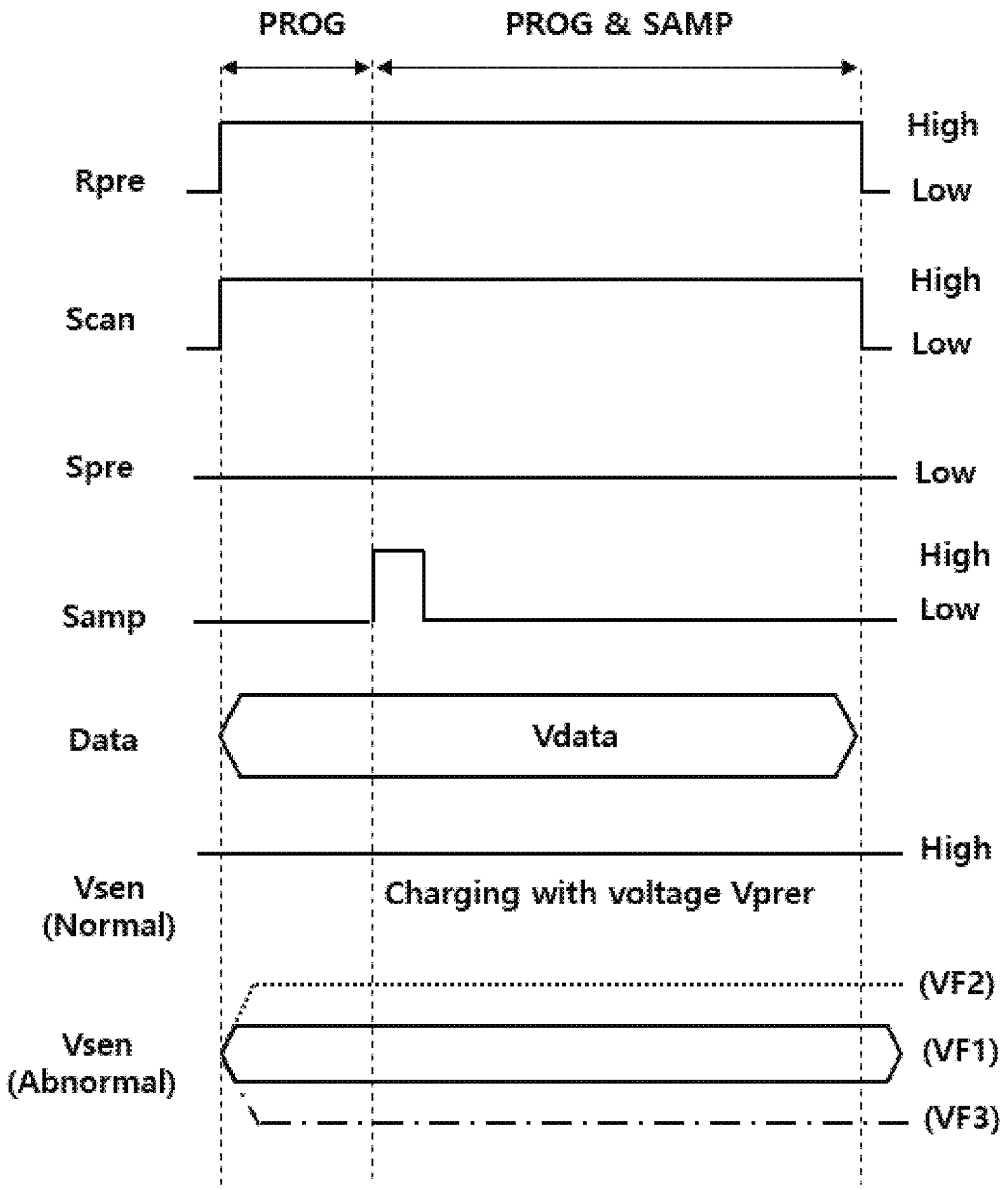

FIGS. 20 and 21 are diagrams for describing a second sensing mode of the LED device implemented according to a third aspect of the present disclosure.

As illustrated in FIGS. 20 and 21, the LED device implemented according to the third aspect of the present disclosure may operate in the second sensing mode (defect detection mode) for detecting presence or absence of an abnormality or defect in the entire display panel during a period in which the driving mode (normal mode) is performed. That is, it is possible to sense the presence or absence of an abnormality or defect in the device in real time.

The second sensing mode (defect detection mode) according to the third aspect may be similar to the second sensing mode (defect detection mode) according to the first aspect. However, an operation of the sampling circuit unit SAM performed in the programming and sampling period PROG & SAMP is different.

Referring to the programming and sampling period PROG & SAMP, the sampling circuit unit SAM may perform sampling upon entering the programming and sampling period PROG & SAMP. To this end, the sampling control signal Samp may be changed to a low voltage after being temporarily applied as a high voltage in synchronization with the programming and sampling period PROG & SAMP. That is, the sampling control signal SAMP may be a high voltage at the beginning of the programming and sampling period PROG & SAMP as shown in FIG. 21. During the programming and sampling period PROG & SAMP, a voltage is relatively stable, such as a period before a data voltage is applied to a data line after a scan signal is generated.

In addition, the second sensing mode (defect detection mode) according to the third aspect may be performed for each horizontal line. That is, defect detection may be performed in response to the number of all gate lines of the display panel. The second sensing mode (defect detection mode) according to the third aspect may detect defect with high accuracy. Therefore, it is preferable to perform the second sensing mode (defect detection mode) according to the third aspect in a state in which the voltage of the first reference line VREF1 is stable.

FIGS. 22 to 25 are diagrams for describing a second sensing mode of the LED device implemented according to a fourth aspect of the present disclosure.

As illustrated in FIGS. 22 to 25, the LED device implemented according to the fourth aspect of the present disclosure may operate in the second sensing mode (defect detection mode) for detecting presence or absence of an abnormality or defect in the entire display panel during a period in which the driving mode (normal mode) is performed. That is, it is possible to sense the presence or absence of an abnormality or defect in the device at the beginning of every frame time.

The second sensing mode (defect detection mode) according to the fourth aspect may be performed similarly to the second sensing mode (defect detection mode) according to the third aspect. However, an operation of the sampling circuit unit SAM performed in the programming and sampling period PROG & SAMP is different.

Figure 22:
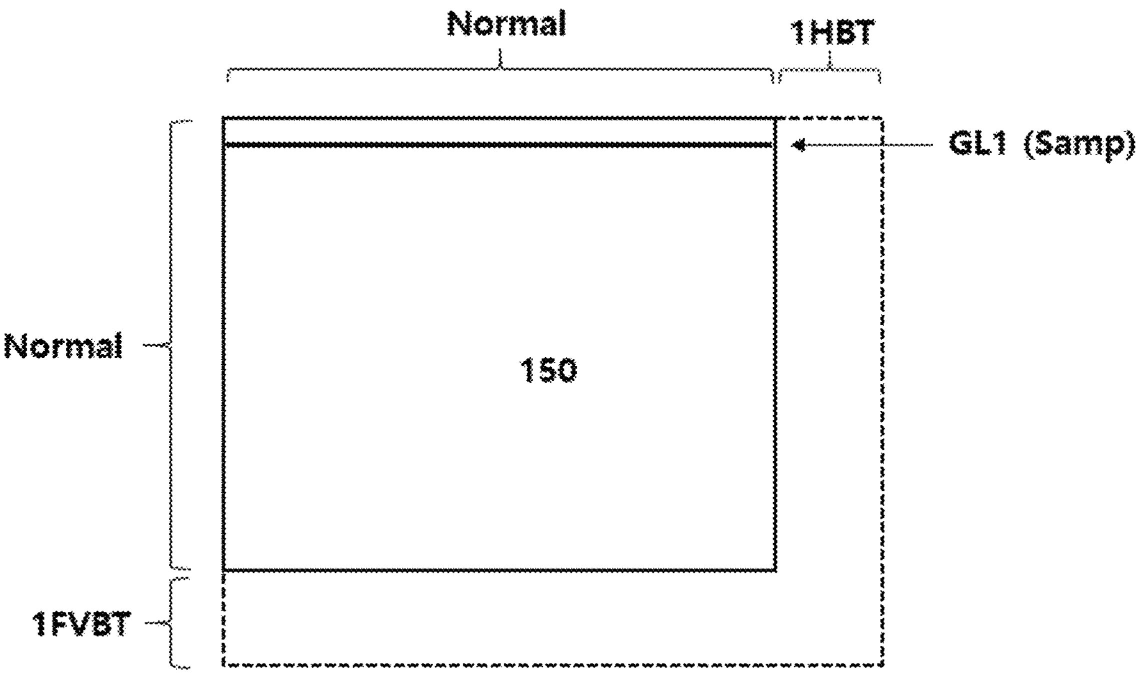
FIGS. 22 to 25 are diagrams for describing a second sensing mode of the LED device implemented according to a fourth aspect of the present disclosure.
Figure 23:
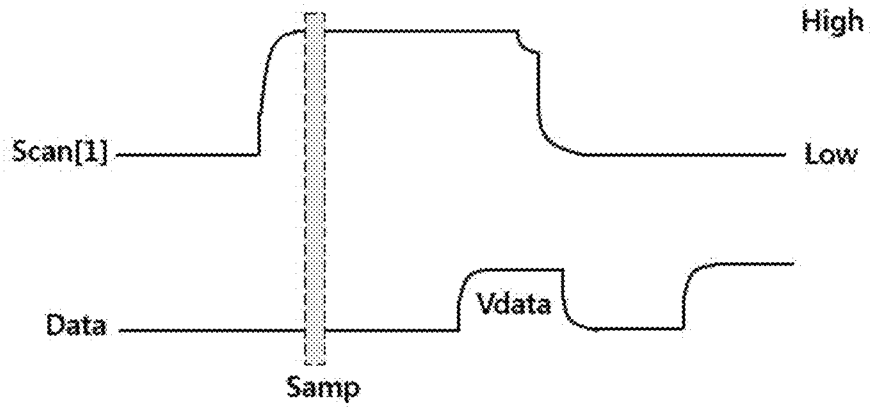
Figure 24:
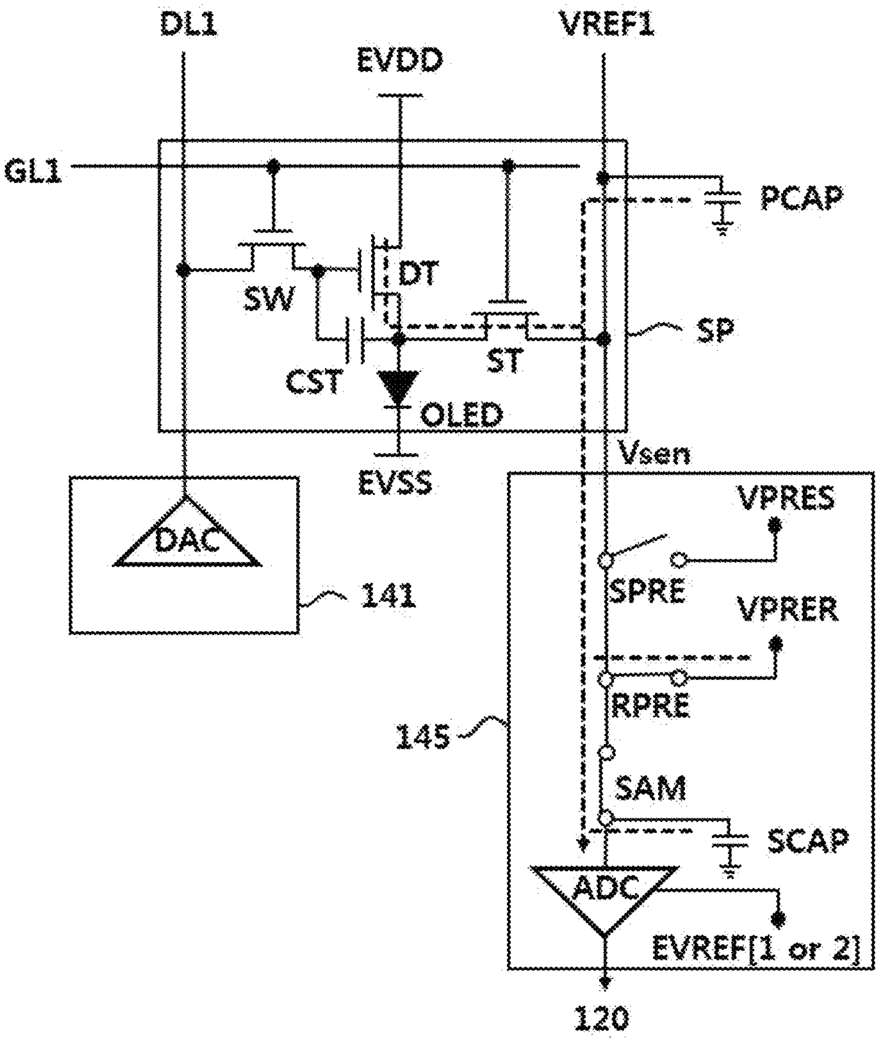
Figure 25:
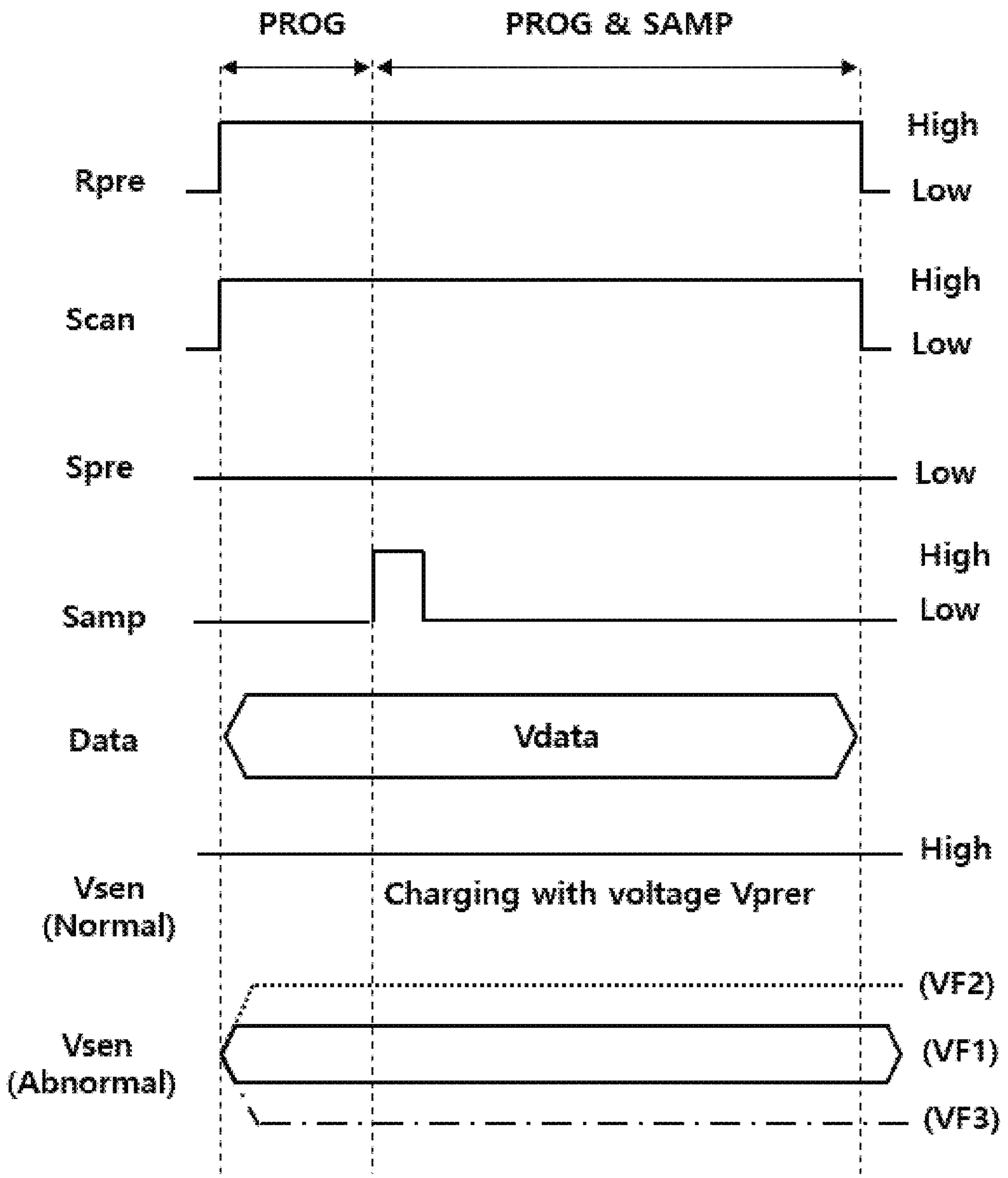

In particular, referring to sampling control signal Samp described in FIGS. 22, 23, and 25, in the sampling circuit unit SAM, the sampling may be terminated after a first scan signal Scan[1] applied to the first gate line GL1 is generated as a high voltage and before the display data voltage Vdata is applied to the data line.

As described above, the voltage may be stable after the scan signal is generated and before the data voltage is applied through the data line since there is only a voltage remaining in the signal line, the reference line, the power line, etc. formed in the display panel.

To this end, after the first scan signal Scan[1] at a high voltage is generated and before the display data voltage Vdata is applied, the sampling control signal Samp may be changed to a low voltage after being temporarily applied as a high voltage. For example, the sampling control signal Samp may comprise a pulse at the start of the PROG & SAMP period as illustrated in FIG. 25.

In addition, unlike the third aspect, the second sensing mode (defect detection mode) according to the fourth aspect may perform sampling (sampling in a generation period of a first scan signal) only for a first gate line GL1 located on a first row of the display panel 150. That is, defect detection may be performed only on the first reference line VREF1 related to the first gate line of the display panel. The second sensing mode (defect detection mode) according to the fourth aspect may minimize voltage fluctuation of the first reference line VREF1 and time required for sensing. In this case, the second sensing mode (defect detection mode) according to the fourth aspect may be performed when the voltage of the first reference line VREF1 is unstable.

When a defect is detected through the above-described aspects, power applied to the display panel, the power supply, the driver, etc. may be turned off to reduce the risk of fire, and an abnormal screen is not visible to a user.

As described above, the present disclosure has an effect in that it is possible to efficiently detect a defect such as presence or absence of an abnormality or defect in the entire display panel during a period for displaying an image on the display panel, and to respond thereto. In addition, the present disclosure has an effect in that it is possible to sense presence or absence of a defect in a driving transistor, an organic light-emitting diode, a power circuit, etc. in real time. In addition, the present disclosure has an effect of not affecting or not being affected by characteristics of an element such as a driving transistor since presence or absence of a defect may be detected and determined based on presence or absence of an abnormality in a DC voltage.

It will be apparent to those skilled in the art that various modifications and variations may be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device comprising:
- a display panel including a sub-pixel connected to a data line and a reference line;
- a driving circuit configured to supply a data voltage to the display panel through the data line; and
- a sensing circuit including a sampling circuit for sensing the display panel through the reference line,
- wherein the sampling circuit includes a sampling switch having a turn-on state within an image display period of the display panel to acquire a sensing voltage by sensing the reference line and determine presence or absence of a defect based on the sensing voltage.

2. The display device of claim 1, wherein the sampling switch continuously maintains a turn-on state during the image display period.

3. The display device of claim 1, wherein the sampling switch maintains a turn-on state after temporarily having a turn-off state during the image display period.

4. The display device of claim 1, wherein the sampling switch is turned off in response to a scale change period for changing a scale of the sensing voltage during the image display period.

5. The display device of claim 4, wherein:
- the sensing circuit further includes an analog-to-digital converter configured to digitize the sensing voltage; and
- during the scale change period, a voltage applied to the analog-to-digital converter changes.

6. The display device of claim 5, wherein, during the scale change period, the voltage applied to the analog-to-digital converter is changed from a high voltage to a low voltage.

7. The display device of claim 1, wherein the sampling switch is turned on before a scan signal is applied to the display panel and the data voltage is applied to the data line.

8. The display device of claim 7, wherein the sensing circuit acquires the sensing voltage within a generation period of a first scan signal applied to a first gate line of the display panel.

9. A display device comprising:
- a display panel including a sub-pixel connected to a data line and a reference line;
- a driving circuit configured to supply a data voltage to the display panel through the data line; and
- a sensing circuit including a sampling circuit for sensing the display panel through the reference line, wherein:
- the sampling circuit includes a sampling capacitor configured to continuously maintain charge sharing with a sensing capacitor connected to the reference line; and
- the sensing circuit acquires a sensing voltage from the sampling capacitor and determines presence or absence of a defect based on the sensing voltage.

10. The display device of claim 9, wherein the sampling circuit comprises:
- an analog to digital converter (ADC) configured to sense the sensing voltage in a first sensing mode and a second sensing mode.

11. The display device of claim 10, wherein the sensing voltage in the first sensing mode corresponds to a voltage threshold or a mobility of an active device in the sub-pixel during an image display period.

12. The display device of claim 10, wherein the sensing voltage in the second sensing mode corresponds to a voltage associated with a defect of the display panel.

13. The display device of claim 12, wherein a notification is output on the display panel to identify the defect.

14. The display device of claim 10, wherein the ADC is supplied a first voltage reference and a second reference voltage during the second sensing mode, and the ADC is supplied the second reference voltage during the first sensing mode.

15. A method of driving a display device, the method comprising:
- charging a data line of a sub-pixel included in a display panel with a data voltage;
- charging a reference line of the sub-pixel included in the display panel with a reference voltage; and
- turning on a sampling switch included in a sampling circuit of a sensing circuit to acquire a sensing voltage through the reference voltage,
- wherein the sampling switch has a turn-on state within an image display period of the display panel.

16. The method of claim 15, wherein the sampling switch maintains the turn-on state during the image display period of the display panel.

17. The method of claim 15, wherein the sampling switch is turned off during the image display period and turned on during the image display period.

18. The method of claim 15, wherein the sampling switch is turned off in response to a scale change period for changing a dynamic range of the sensing voltage.

* * * * *